Dec. 14, 1954    T. H. BALCH ET AL    2,696,853
REMOTE-CONTROL SETWORK

Filed Feb. 12, 1951    7 Sheets-Sheet 1

INVENTORS
Theodore H. Balch &
BY Ray F. Van DeMark

Oliver D. Olson
Their Agent

Dec. 14, 1954
T. H. BALCH ET AL
2,696,853
REMOTE-CONTROL SETWORK
Filed Feb. 12, 1951
7 Sheets-Sheet 2
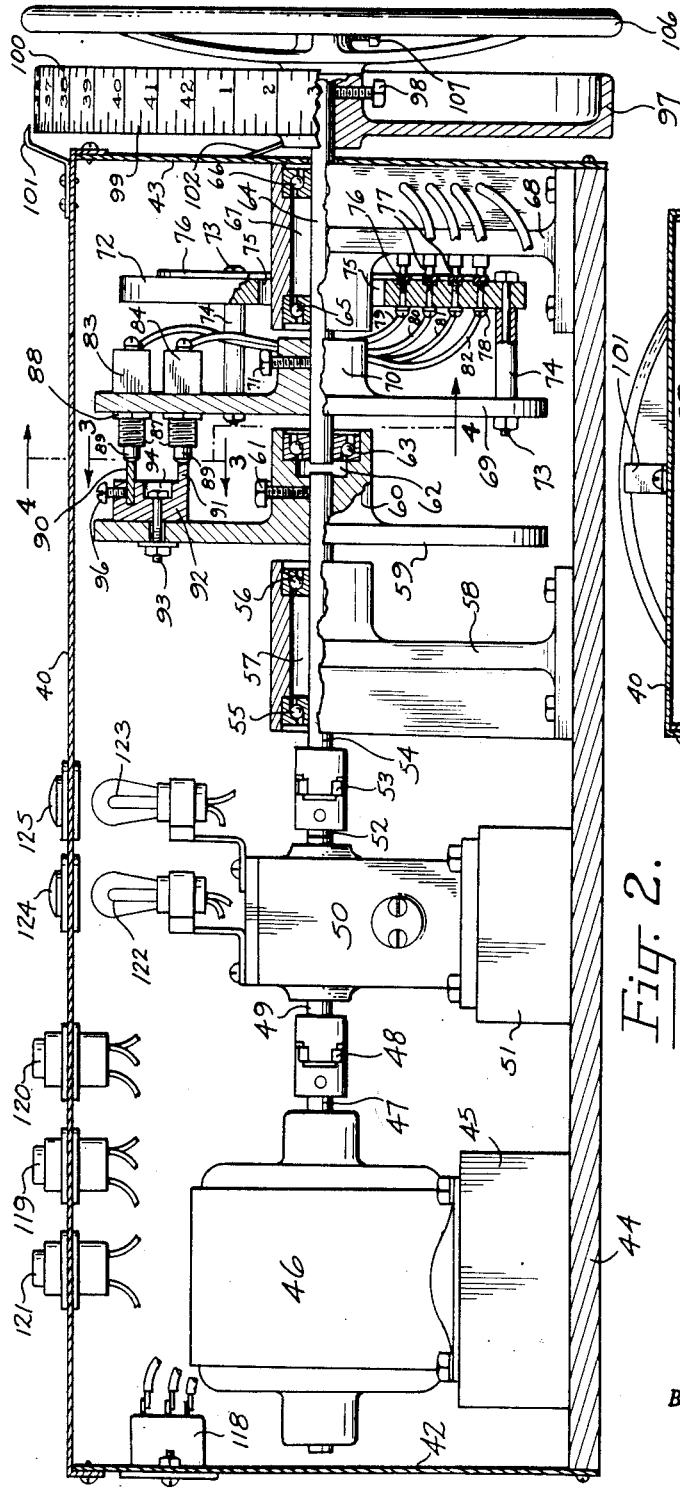
Fig. 2.
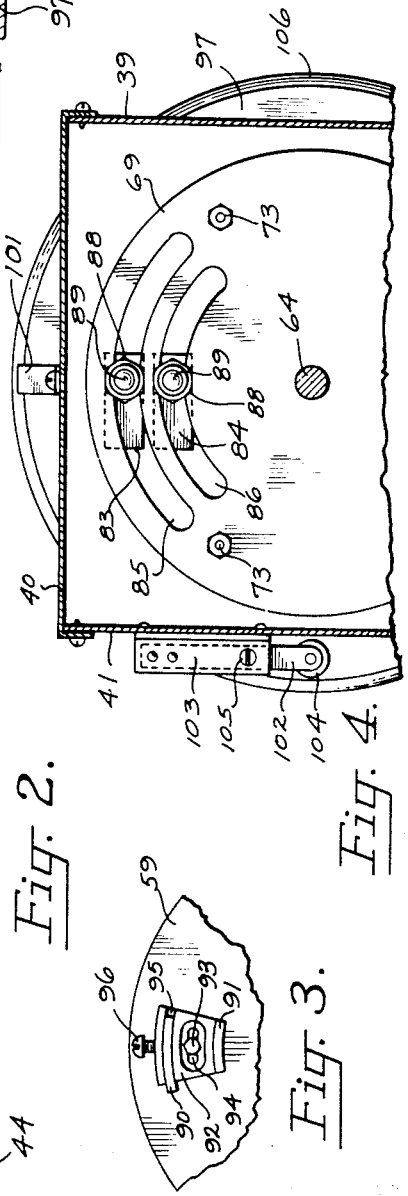
Fig. 3.
Fig. 4.
INVENTORS
Theodore H. Balch &
BY Ray F. Van De Mark
Their Agent Dec. 14, 1954   T. H. BALCH ET AL   2,696,853
REMOTE-CONTROL SETWORK
Filed Feb. 12, 1951   7 Sheets-Sheet 4
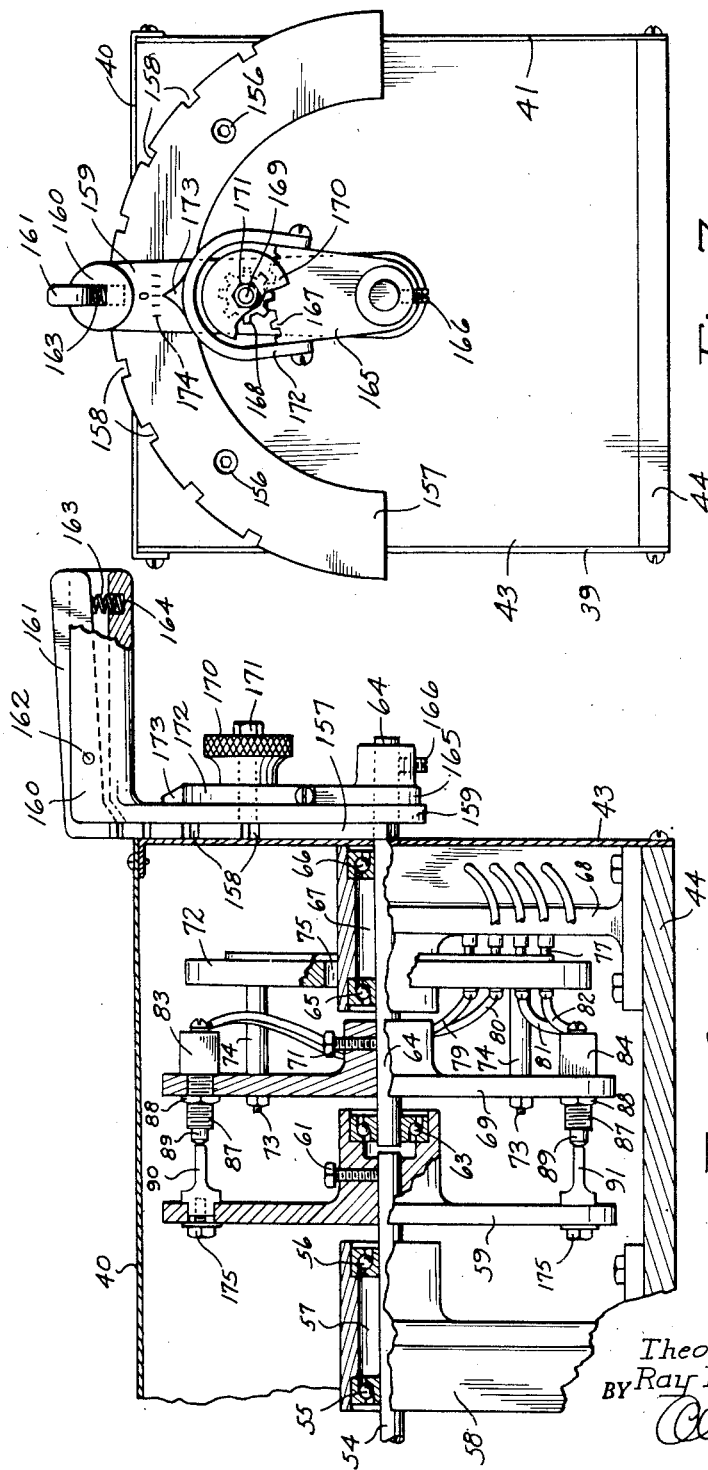
INVENTORS
*Theodore H. Balch &*
BY *Ray F. Van De Mark*
*Oliver D. Olson*
Their Agent

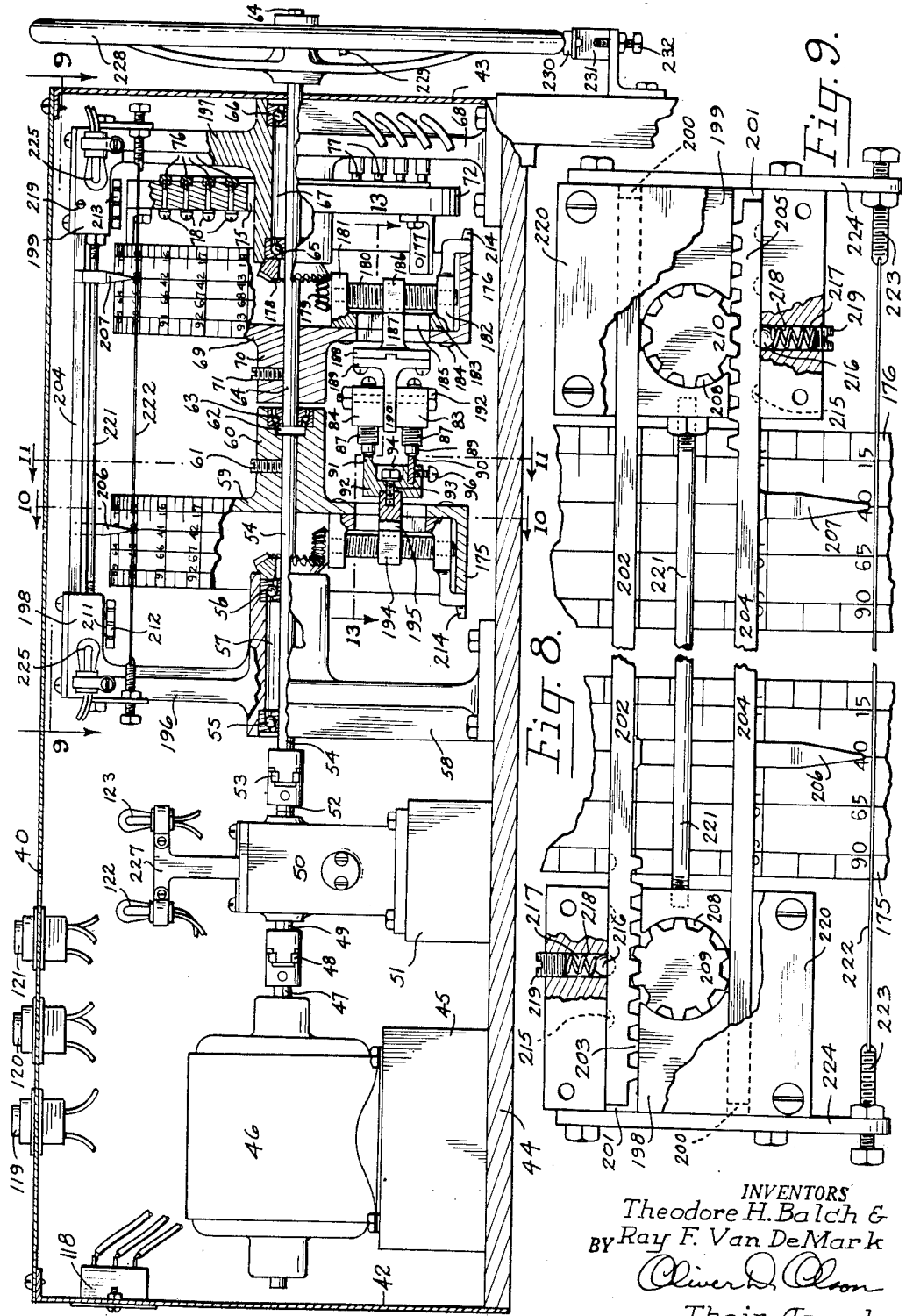

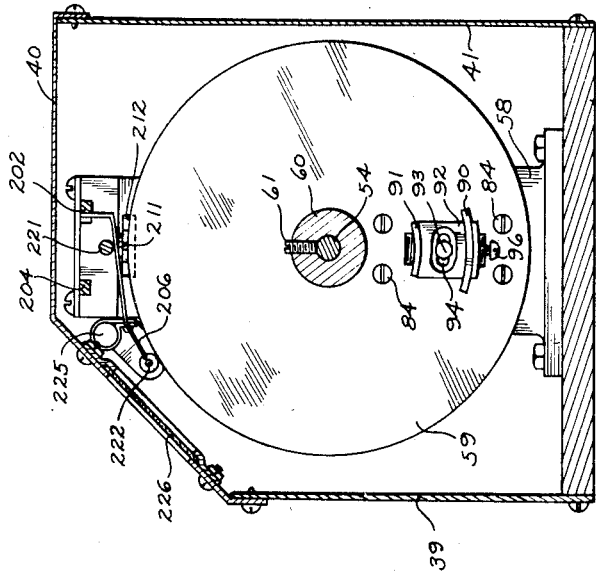
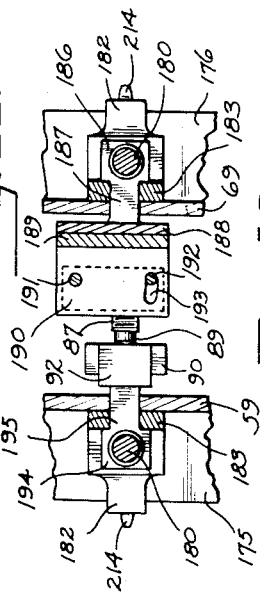
Fig. 11.
Fig. 13.
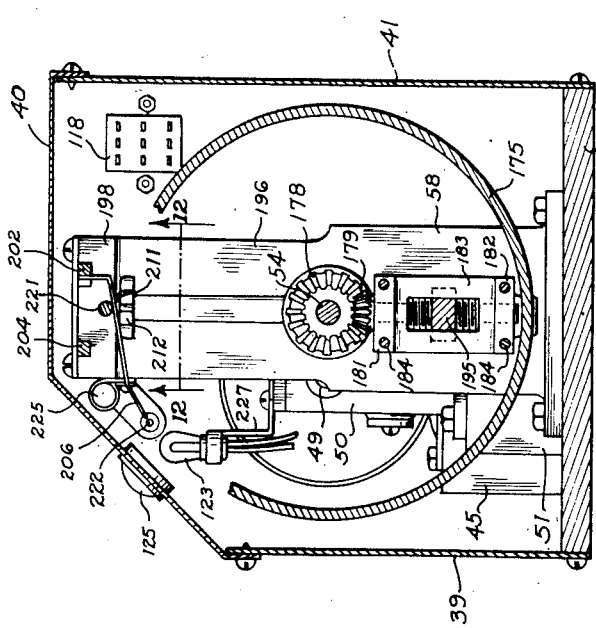
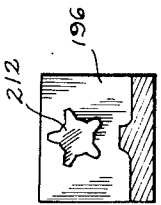
Fig. 10.
Fig. 12.
INVENTORS
Theodore H. Balch &
BY Ray F. Van De Mark
Oliver D. Olson
Their Agent

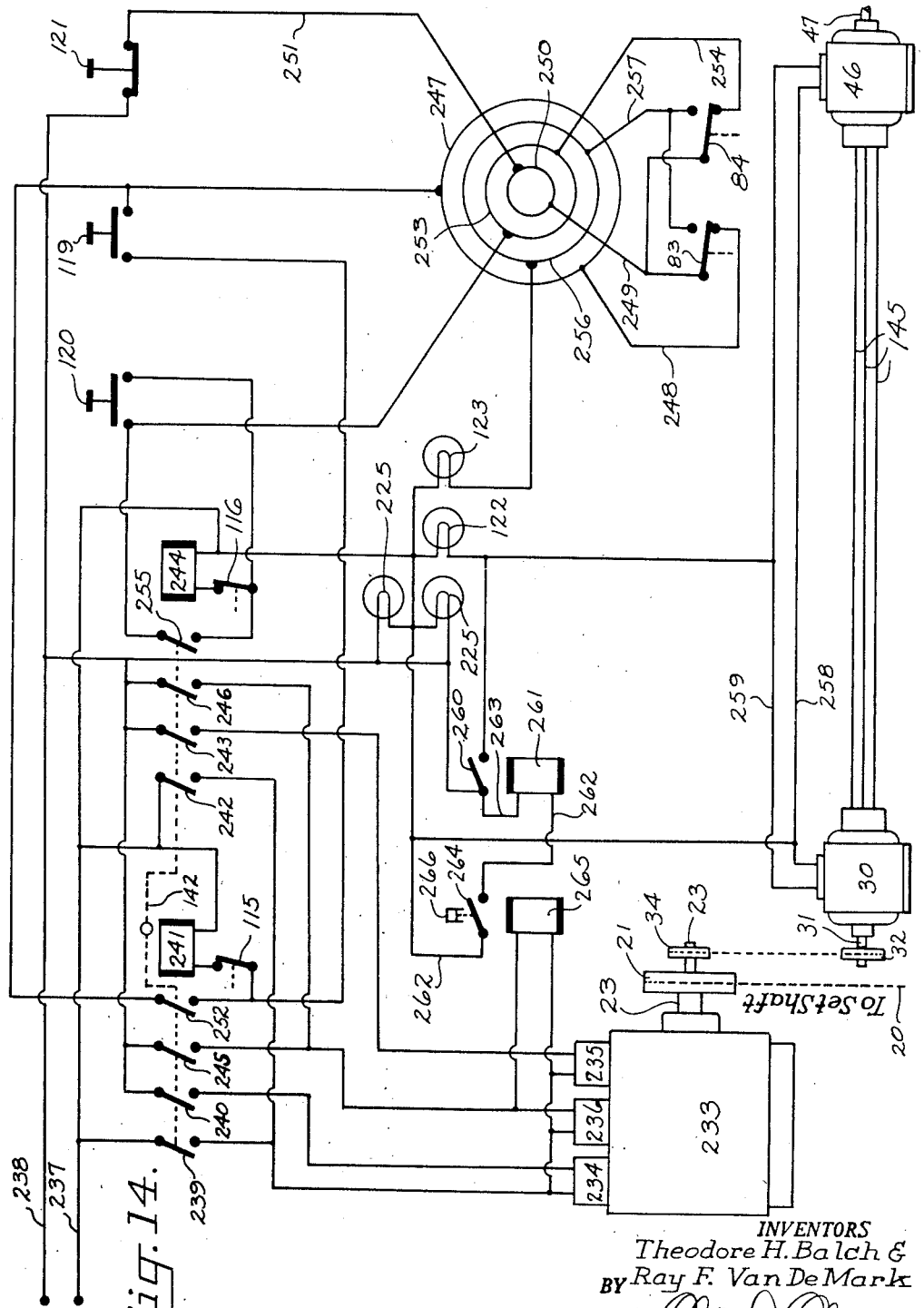

United States Patent Office 2,696,853
Patented Dec. 14, 1954

2,696,853

REMOTE-CONTROL SETWORK

Theodore H. Balch, Salem, and Ray F. Van De Mark, West Salem, Oreg., assignors, by direct and mesne assignments, to Sel-Set Company, West Salem, Oreg., a corporation of Oregon Application February 12, 1951, Serial No. 210,581

17 Claims. (Cl. 143—120)

This invention pertains to setworks, and relates particularly to the novel construction of a sawmill setworks by which the operation of a sawmill carriage assembly may be controlled from a remote position.

There are many types of machines in each of which the fundamental basis of operation involves the relative adjustment between a work support and a cooperating working tool. In some machines this adjustment is afforded by movement of the work support relative to a fixed working tool, while in other machines the working tool is adjustable with respect to a fixed work support. Still other machines provide for movement of both the work support and the working tool. In general, such movement of working parts is achieved by the rotation, i. e. angular displacement, of a driven shaft, and it is to this type of machine that the present invention is applied with particular advantage.

For purposes merely of illustration the present invention is described hereinafter with particular reference to sawmill setworks. Since, as explained hereinbefore, various other types of machines operate upon the same basic principle, the specific reference to sawmill setworks is not intended as a limitation upon the scope of this invention.

Briefly, the construction and operation of a conventional sawmill carriage assembly is as follows: The carriage is a wheeled framework supported upon spaced rails which guide the carriage back and forth past a powered saw. The carriage includes a plurality of spaced head blocks upon which to support a log intended to be sawed into boards. Retractable dogs secure the log releasably in abutment with knees which are mounted slidably upon the head blocks and coupled to a power driven set shaft through lead screws or knee chains. By selective rotation of the set shaft, as controlled by the operator, the knees, and hence the log, are moved forward or rearward with respect to the saw.

The selective control of the set shaft is achieved by means of setworks, many types of which are well-known in the art. However, there is a fundamental principle of operation common to all of these prior setworks, namely, they are mounted upon and are required to be operated from the moving carriage. Thus, it is necessary that the operator be stationed upon and ride with the carriage in order to operate the setworks of the prior art. This arrangement is not only uncomfortable for the operator, but it also exposes him to the extreme hazards of flying particles such as occurs, not infrequently, with the breakage of a saw blade.

It is a principal object of the present invention, therefore, to provide a setworks whereby the operation of the sawmill carriage assembly may be controlled from the safety of a remote position.

Another important object of this invention is the provision of a setworks in which adjustment for the next succeeding cut of the log may be made during the preceding cutting operation. By this provision the linear footage production of lumber from the mill is increased substantially.

A further important object of the present invention is the provision of a setworks which affords complete control of the sawmill carriage assembly by but one operator, thereby obviating the loss of time and the presentation of hazards ordinarily attending the operation of a carriage by a crew.

A still further object of this invention is to provide a setworks constructed of a minimum of parts, which is sturdily built for long operating life and which is capable of effecting rapid and precise adjustment of the set shaft.

A general object of this invention is the provision of a device for controlling from a remote position the selective angular displacement of a rotary shaft.

These and other objects and advantages of the present invention will appear from the following detailed description taken in connection with the accompanying drawings, in which:

Figure 2 is a front elevation of the setworks illustrated generally in Figure 1, with portions thereof broken away to disclose details of construction;

Figure 3 is a fragmentary view of the switch actuator as taken along the line 3—3 in Figure 2;

Figure 4 is a fragmentary sectional view taken along the line 4—4 in Figure 2;

Figure 6 is a fragmentary front elevation of a modified form of setworks embodying the features of the present invention, parts thereof being broken away to disclose details of construction;

Figure 7 is an end view of the setworks as viewed from the right in Figure 6;

Figure 8 is a front elevation of a further modified form of setworks embodying the features of this invention, parts thereof being broken away to disclose details of construction;

Figure 9 is a fragmentary and foreshortened plan view as taken along the line 9—9 in Figure 8;

Figure 10 is a sectional view taken along the line 10—10 in Figure 8;

Figure 11 is a sectional view taken along the line 11—11 in Figure 8;

Figure 12 is a sectional view taken along the line 12—12 in Figure 10;

Figure 13 is a fragmentary sectional view taken along the line 13—13 in Figure 8; and Figure 14 is a schematic diagram of the electrical control circuits of the setworks of Figures 8 to 13, inclusive.

Stated broadly, the setworks of the present invention involves the cooperative arrangement of at least one electrical break switch for controlling the circuit of the set shaft motor control and an actuating arm for the switch, the switch and arm being mounted upon independently rotatable supports, one of which is interconnected with the sawmill carriage set shaft and the other of which is adjustable by the operator for controlling the position of the carriage knees relative to the plane of the cutting saw.

Figure 1:
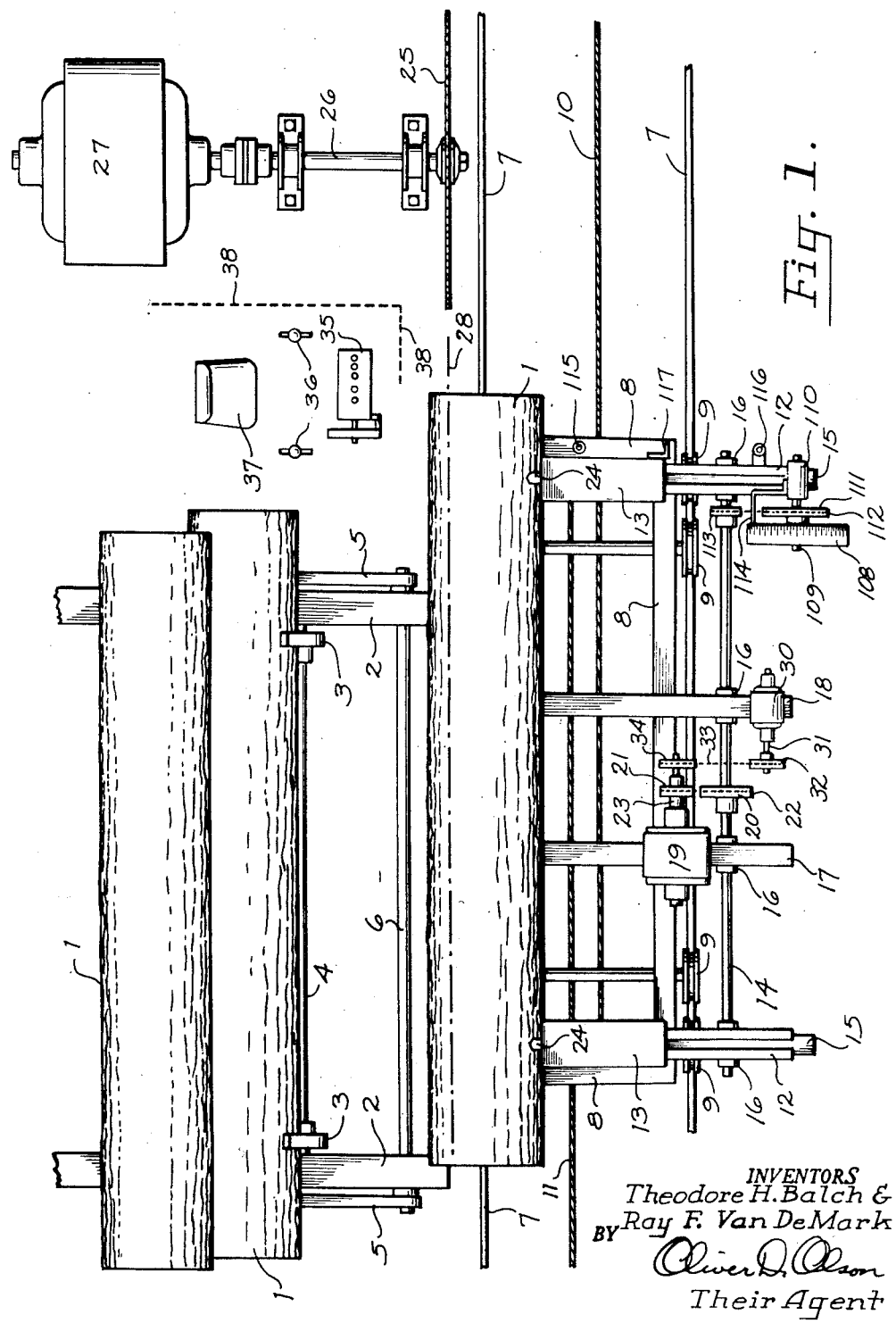
Figure 1 is a fragmentary plan view of a sawmill showing incorporated therewith a setworks embodying the features of the present invention.

Referring particularly to Figure 1 of the drawings, there is shown for purposes of illustration the general details of one form of conventional sawmill. The sawmill includes a log deck upon which logs 1 are deposited, as from a millpond, preparatory to cutting. The log deck comprises the spaced deck skids 2, the cradle-type stop and loaders 3 secured to the shaft 4 and the log loaders 5 secured to the shaft 6. The shafts 4 and 6 are driven by motor means (not shown) in manner well-known in the art.

Adjacent the forward end of the log deck and extending perpendicularly with respect thereto is a pair of spaced parallel rails 7. A log carriage framework 8 is supported upon the rails by wheels 9 and is drawn forwardly and rearwardly thereon by cables 10 and 11, respectively, each of which is secured at one end to the framework and at the other end to a power winch (not shown).

Extending transversely of the carriage framework are spaced head blocks 12 upon which a log 1 is deposited from the log deck. An upstanding knee 13 is supported slidably upon each head block for longitudinal movement thereover. The knees are connected to a power driven set shaft 14 by any conventional means such as the lead screws 15 or knee chains. The set shaft extends longitudinally of the carriage and is journaled in bearings 16 supported by the head blocks 12 and by the intermediate frame members 17, 18. In the carriage assembly illustrated, the set shaft is driven by means of an electric motor 19 mounted upon the frame member 17. The motor is coupled to the set shaft by chain 20 reeved over sprocket wheels 21 and 22 secured, respectively, to the drive shaft 23 of the motor 19 and to the set shaft 14. It will be apparent to those skilled in the art that an air or other type of drive motor may be substituted for the electric motor illustrated and that various other types of coupling means may be employed, as desired.

The log 1 is arranged upon the head blocks 12 in abutment with the knees 13 and is secured releasably in that position by the retractable dogs 24 mounted in the knees. In this manner the log is rendered movable with the knees as the latter are actuated by rotation of the set shaft 14.

A cutting saw blade 25 is arranged adjacent the forward rail in such manner as to clear the head blocks 12 as the carriage is moved along the rails. The saw blade illustrated in Figure 1 is of the circular type mounted upon an arbor 26 which is driven by motor 27. It will be understood by those skilled in the art that other types of saw blades, such as the band saw blade, may be employed as desired.

Preparatory to cutting the log, the knees are moved forward, i. e. toward the saw blade 25, a distance sufficient to cause the log to intercept the plane 28 of the saw blade to the extent required for making the desired slab cut, as indicated by the dot-and-dash line in Figure 1. This controlled movement of the knees is effected by the selective rotation of the power driven set shaft, and it is this rotation of the set shaft that is regulated by setworks.

As stated hereinbefore, the setworks of the prior art are mounted upon the movable carriage, thus making it necessary for the operator to ride with the carriage. It is a particular advantage, on the other hand, that the setworks of the present invention may be operated from a remote position with respect to the carriage, as explained in detail hereinafter.

Figures 1 to 5, inclusive, illustrate the construction and arrangement of one form of setworks embodying the novel features of the present invention. In Figure 1 a master selsyn motor 30 is mounted upon the intermediate frame member 18. The drive shaft 31 of the master selsyn carries a sprocket wheel 32 which is connected through chain 33 to sprocket wheel 34 mounted upon the reduced end of drive shaft 23 of the electric motor 19. Electrical wires, omitted in Figure 1 to avoid encumbering the view but illustrated diagrammatically in Figure 5, lead from the master selsyn 30 and from the electric motor 19 to the setworks control mechanism illustrated generally in Figure 1 as contained in the case 35.

The case is located conveniently between the log deck and the saw blade 25 and is preferably arranged slightly forward of but between the spaced levers 36 by which the operator controls the movements of the log deck and carriage assembly from his position in seat 37. The setworks control case 35, the levers 36 and seat 37 may be shielded, if desired, by the protective walls indicated by the dotted lines 38 to insure the operator against injury from flying particles.

Referring now to Figures 2 and 4 of the drawings, the case 35 housing the setworks control mechanism includes the front wall 39, top wall 40, rear wall 41, side walls 42 and 43 and the bottom 44. The walls form detachable panels which are removable to facilitate maintenance of the mechanism contained within the case. The case is preferably supported upon an elevated frame or table (not shown) at a height convenient to the operator from his position in the seat 37.

Mounted upon a pedestal 45 supported upon the bottom 44 adjacent the left side wall 42 is a slave selsyn motor 46. The drive shaft 47 of the slave selsyn is connected by the flexible coupling 48 to the input shaft 49 of a gear reduction unit 50. The reduction unit is mounted upon pedestal 51 supported upon the bottom 44. The output shaft 52 of the gear unit is connected by flexible coupling 53 to one end of a shaft 54. This shaft is supported intermediate its ends in spaced bearings 55, 56 mounted at opposite ends of a transverse bore 57 formed in the upper end of the upright support 58.

Upon the end of shaft 54 opposite the coupling 53 a disc 59, hereinafter referred to as the set shaft disc, is supported at its hub 60 by means of set screw 61. The hub extends beyond the end of shaft 54, the extension being provided with an enlarged stepped axial bore 62. A bearing 63 is mounted within the said bore to receive one end of a second shaft 64. The said second shaft is supported intermediate its ends in spaced bearings 65, 66 mounted at opposite ends of the transverse bore 67 formed in the upper end of the upright support 68.

It is to be noted here that the shafts 47, 49, 52 and 54 are connected together to rotate as a unit, but that shaft 64 rotates independently thereof.

A disc 69, hereinafter referred to as the control disc, is supported upon the shaft 64 adjacent the end supported by bearing 63. Said disc is secured removably to the shaft 64 at its hub 70 by means of set screw 71. The control disc 69 supports an electrically nonconducting collector ring 72 by means of circumferentially spaced bolts 73. The disc and ring are secured in spaced relation by the spacer tubes 74 mounted upon the bolts intermediate the ends thereof. The collector ring is provided with a central opening 75 of sufficient diameter as to receive freely therethrough the projecting upper end of the support 68. A plurality of electrically conducting contact rings 76 are mounted in spaced concentric arrangement upon the side of the collector ring facing the support 68. Sliding electrical contact with the rings is made by such means as the conventional spring-loaded carbon brushes 77 mounted in the hollow upright support 68, as shown.

An electrically conducting terminal screw 78 is secured to each contact ring 76. Each screw projects transversely through the non-conducting ring 72 for purposes of attaching thereto one of the conductor wires 79, 80, 81, and 82. Wires 79 and 80 lead to the forward microswitch 83, while wires 81 and 82 lead to the reverse microswitch 84, as described in detail hereinafter. The microswitches 83 and 84 are secured to control disc 69 preferably in the manner illustrated in Figure 4. Therein is shown a pair of concentric arcuate slots 85, 86 formed transversely through the control disc adjacent the outer periphery thereof. The threaded extensions 87 of the microswitches are inserted in said slots and the securing nuts 88 tightened against the disc to secure the switches in the position selected. Although the provision of the arcuate slots 85, 86 affords a substantial degree of adjustability of the microswitches, it is to be noted here that in many instances no adjustment of the microswitches is required. Thus, merely small holes may be provided in place of the elongated slots.

The spring-loaded contacts 89 of the microswitches 83, 84 project toward the set shaft disc 59, as shown in Figure 2 of the drawings. Mounted upon the set shaft disc for cooperative engagement with the contacts of switches 83, 84 are a pair of projecting finger cams 90 and 91, respectively. These fingers are of substantial width and are curved longitudinally to correspond with the radius of rotation of the respective microswitches, as best shown in Figure 3. Finger 91 forms an integral part of the block 92 which is secured to the set shaft disc 59 by means of bolt 93. The bolt passes through an arcuate slot 94 in block 92 and thence through a hole provided in disc 59. Thus, circumferential adjustment of the block is afforded by moving the latter along the slot. Finger 90 is slidably received within an arcuate groove 95 formed in the block 92. In this manner the finger 90 may be adjusted circumferentially with respect to the finger 91. A set screw 96 is threaded in block 92 to secure the finger 90 in any position selected.

The end of shaft 64 opposite the bearing 63 extends outwardly of the case through an opening in the side wall 43. Upon this outwardly projecting end of the shaft a control dial wheel 97 is secured by means of the set screw 98 mounted in the wheel hub. The peripheral surface of the dial wheel is scored or otherwise impressed to provide a linear scale. Although the scale is preferably graduated in inches and fractions thereof, other units of measure may be employed to accommodate specific installations. In Figure 2 of the drawings, two scales are shown to be provided; scale 99 being graduated in quarters of inches and scale 100 being graduated in thirds of inches. In this manner the control dial affords ready adaptation of the setworks for use with saw blades of any conventional or desired cutting width, as fully explained hereinafter.

An index pointer 101 is mounted upon the top wall 40 for registry with the graduated scales on the control dial 97. A leaf spring 102 is secured at one end to a bracket 103 (Figure 4) mounted upon the rear wall of the case. The opposite end of the spring carries a leather button 104. An adjustment screw 105 mounted upon bracket 103 is arranged to engage the spring 102 intermediate its ends. Thus, by proper adjustment of screw 105, the spring is bent outwardly and the leather button is urged into frictional contact with the side of dial wheel 97. This frictional engagement of the button and wheel prevents undesirable free rotation of the latter after it has been set by the operator in the manner explained hereinafter.

A control hand wheel 106 is also secured at its hub to shaft 64 by set screw 107. The hand wheel functions to be grasped by the hand of the setworks operator for rotating the shaft 64 during operation of the setworks, as described in detail hereinafter.

By virtue of the positive coupling between the knees 13 and the set shaft 14, as afforded by the lead screws 15, there is established a definite relationship between the linear distance through which the knees travel and the angular rotation of the set shaft. Thus, because of the positive connections between the set shaft 14, the drive shaft 23 of the electric motor 19 and the drive shaft of the master selsyn motor 30, a direct relationship also exists between the linear movement of the knees and the angular rotation of the master selsyn. This master selsyn is coupled electrically to the slave selsyn motor 46 mounted at a remote position in the case 35. The slave selsyn 46 is coupled through the reduction unit 50 and shaft 54 to the set shaft disc 59 which cooperates with control disc 69 through the supported arrangement of the microswitches 83 and 84 and the finger cams 90 and 91, respectively. Disc 69 is, in turn, connected directly through shaft 64 to the control dial wheel 97. Thus, there is obtained a direct relationship between the linear movement of the knees 13 per revolution of the control dial 97.

By proper selection of the foregoing sprockets and gears interconnecting the control dial 97 and the knees 13, each linear calibration of the graduated scale of the control dial represents an identical length of movement of the knees upon the head blocks 12.

Stated in general terms, there is a direct relationship between the angular rotation of the set shaft and the angular rotation of the control dial 97.

Mounted upon the moving carriage is a reference dial 108 (Figure 1). This dial is mounted upon shaft 109 journaled for rotation in bearing 110 secured to an upright support of the carriage. A sprocket wheel 111 secured to shaft 109 is connected through chain 112 to sprocket wheel 113 mounted upon the set shaft 14. The graduated scale on the reference dial is identical with the scale on the control dial 97. An index pointer 114 is mounted upon the upright support for bearing 110 for registry with the reference dial. By proper selection of sprocket wheels 111 and 113, the indicated graduation on the reference dial under the index pointer identifies the number of inches separating the knees 13 and the plane of the saw blade 25.

Figure 5:
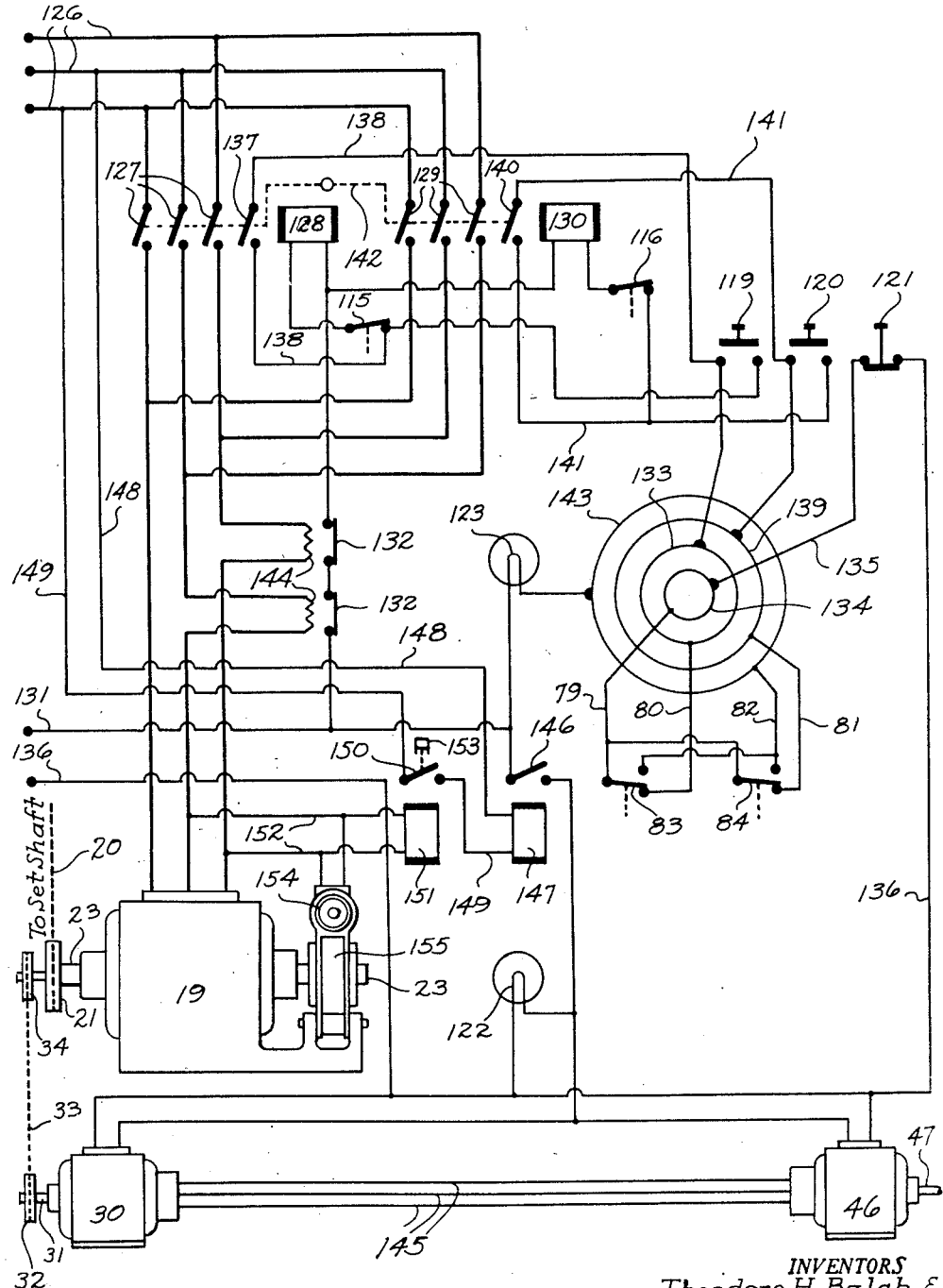
Figure 5 is a schematic diagram of the electrical control circuits of the setworks shown in Figures 1 to 4, inclusive, and Figure 6.

In Figure 1 there is shown a forward limit switch 115 and a reverse limit switch 116 mounted upon elements of the carriage framework adjacent the right-hand knee 13. These switches are arranged in the circuits of the drive motor controls, as shown in Figure 5. A finger 117 projecting laterally from the knee is arranged to contact the forward and reverse limit switches at the extreme opposite limits of travel of the knees. Thus, upon contact of the finger 117 with either switch, the circuit to the drive motor 19 is opened and rotation of the set shaft 14 is stopped. In this manner the linear travel of the knees is restricted to the length of the head blocks 12 or to any shorter distance desired.

Referring to Figure 2, a terminal block 118 is mounted on the side wall 42 of the case. This block functions as a detachable coupling for the electrical conductors extending between the mechanism contained within the case 35 and the mechanism mounted externally thereof, as explained hereinafter.

Shown in Figure 2 are the electrical contact forward button 119, the reverse push button 120 and the stop push button 121. As explained in detail hereinafter, these push buttons provide the operator with finger tip control for the actuation of the drive motor 19. The push buttons are shown mounted upon the top wall 40 of the case 35. In some instances it may be found more convenient to mount these control push buttons independently of the case. If so desired, proper connections are afforded through the terminal block 118.

Also provided within the case 35 are the indicator lights 122 and 123 shown in Figure 2 mounted upon the reduction unit 50. Light bulb 122 registers with a red colored jewel 124 mounted in the top panel, while the light bulb 123 registers with a similarly mounted green colored jewel 125. These colored indicator lamps function to identify certain operations of the setworks mechanism, as explained in detail hereinafter.

Referring now to Figure 5 of the drawings, there is shown an electrical diagram by which the several elements described hereinbefore are preferably connected together. The drive motor 19 is connected to a source of electrical supply, such as the 440 volt lines 126, through the normally open breaker contacts 127 of the forward relay coil 128 and through the normally open breaker contacts 129 of the reverse relay coil 130. The circuit of the forward relay coil 128 is completed, by depressing the forward push button switch 119, from line 131 of the 110 volt supply through the overload breakers 132, the forward relay coil 128, the normally closed forward knee limit switch 115, the forward push button switch 119, collector ring 133, through line 80 and the normally closed forward microswitch 83 to line 79 and collector ring 134, through line 135 and the normally closed stop push button switch 121 to line 136 of the 110 volt supply. The forward relay coil remains energized after the forward push button is released by virtue of the closing of the holding contact 137 the circuit of which is arranged in parallel with the forward push button switch 119 by lines 138, as shown.

The circuit of the reverse relay coil 130 is completed from line 131 of the 110 volt supply through the overload breakers 132, the reverse relay coil 130, the normally closed reverse knee limit switch 116, the reverse push button switch 120, collector ring 139, through line 81 and the normally closed reverse microswitch 84 to line 79 and collector ring 134, through line 135 and the normally closed stop push button switch 121 to line 136 of the 110 volt supply. The closure of the holding contact 140 arranged in parallel with the reverse push button switch 120 by lines 141 maintains the reverse relay coil energized after the latter switch is opened. A mechanical interlock, indicated by the broken line 142 in Figure 5 prevents simultaneous closures of contacts 127, 137 and 129, 140 in manner well-known in the art.

It is apparent that the circuits of the forward and reverse relay coils will be broken upon opening of the normally closed microswitches 83 and 84, respectively. These latter switches are opened upon contact of the respective finger cams 90 and 91, as explained hereinbefore. When the forward or reverse microswitch is opened, a circuit is completed from the 110 volt line 131 through the green indicator bulb 123 to collector ring 143, through line 82 to the forward or reverse microswitch, through line 79 to collector ring 134, and thence through line 135 and the normally closed safety stop switch 121 to line 136 of the 110 volt supply. The circuits of the forward and reverse relay coils may also be broken away by depressing the emergency stop push button 121. Additionally, these circuits will be broken whenever an overload is placed upon motor 19 sufficient to cause the heater elements 144 to melt the overload breakers 132.

The selsyn motors 30 and 46 are interconnected by wires 145 and are energized from the 110 volt supply lines 131 and 136. Arranged in series in the 110 volt line 131 between the green light bulb 123 and the Selsyn motors is the normally open contact switch 146 of the selsyn relay coil 147. This latter coil is connected through lines 148 and 149 to two of the three 440 volt supply lines 126 ahead of the normally open breaker contacts 127 and 129 of the forward and reverse relay coils 128 and 130, respectively. A normally open contact switch 150 is placed in series in line 149 of the selsyn relay coil 147. The switch 150 is actuated by the timer coil 151 connected by lines 152 to two of the three 440 volt supply lines 126 between the motor 19 and the foregoing contacts of the forward and reverse relay coils 128 and 130.

The contact switch 150 is provided with a dash pot 153 or other conventional means which functions to delay the opening of the said contact switch after closure by the timer coil 151, for purposes explained in detail hereinafter. Also connected to lines 152 is the solenoid 154 of brake 155 which functions to brake the rotation of the drive shaft 23 of motor 19 when the latter is de-energized.

The light bulb 122 registering with the red jewel 124 shown in Figure 2 is connected between the 110 volt supply lines 131 and 136, the connection with line 131 being made between the selsyn motors and the normally open switch 146. Thus, the red light functions to indicate that switch 146 is closed and that the selsyn motors are being energized from the 110 volt lines.

The four relay coils and their corresponding contacts are preferably mounted in a box secured upon the protective wall adjacent the operator's position.

The operation of the setworks described hereinbefore is as follows, it being assumed that the entire sawmill assembly is energized and ready for operation: The sawyer, stationed at the seat 37 manipulates the levers 36 to cause a log 1 to be deposited from the log deck upon the head blocks 12 of the carriage and in abutment with the knees 13. The dogs 24 are then set to secure the log against the knees. By visual observation the operator estimates, for example, that the log is about 35 inches in diameter. Accordingly, he grasps the control hand wheel 106 and rotates it to bring the value of 35 inches on the control dial 97 under the index pointer 101. Assuming that the knees are observed to be closer to the saw blade 25 than 35 inches, the foregoing rotation of the control dial has thereby caused the microswitches 83 and 84 to be displaced circumferentially, and in the reverse direction, from the finger cams 90 and 91, respectively. Under this condition the microswitches are in their normally closed position, as shown in Figure 5. The operator now presses the reverse push button 120.

With the closing of the reverse push button 120 the circuit of the reverse relay coil 130 is completed, as previously described, the holding contact 140 maintaining the closed circuit after the reverse push button has been released. The breaker contacts 129 in the 440 volt supply lines 126 thereupon close to energize the brake solenoid 154 and release the brake 155 and also to energize the set shaft motor 19. Simultaneously with the activation of motor 19 the timer relay coil 151 is energized and the delay contact 150 closes to energize the selsyn relay coil 147. The selsyn relay contact switch 146 thereupon closes to complete the 110 volt circuit of the selsyn motors 30 and 46 and to the red indicator lamp 122.

The set shaft motor 19 rotates in its reverse direction to drive the set shaft and move the knees 13 and log 1 away from the plane of the saw blade 25. The master selsyn 30 rotates with the motor 19 and imparts identical rotation to the slave selsyn 46 mounted in the case 35 at the operator's station. The rotation of the slave selsyn is imparted to the shaft 54 through the gear reduction unit 50. Thus, as shaft 54 rotates, the finger cams 90 and 91 supported upon the set shaft disc 59 are rotated toward the position of the respective microswitches 83 and 84.

As the finger cam 91 engages the reverse microswitch 84 the latter opens and breaks the circuit of the reverse relay coil 130. The breaker contacts 129 then open the 440 volt supply lines to deenergize the set shaft motor 19 and the solenoid 154 of brake 155. The latter thereupon engages the brake band secured to the drive shaft 23 of the motor 19.

With the opening of the contacts 129 of the reverse relay coil 130 the timer relay coil 151 is deenergized. However, by virtue of the time delay mechanism, represented in Figure 5 as a dash pot 153, the opening of contact 150 is delayed for a time sufficient to keep the selsyn relay 147 energized until the set shaft motor 19 has been braked to a complete stop. By so maintaining the selsyn relay 147 energized, contact 146 remains closed and the selsyn motors remain energized. In this manner the slave selsyn 46 will track the master selsyn 30 through the normal override of the set shaft motor 19. When this time delay is completed the contact 150 opens to break the circuit of the selsyn relay coil 147 which, in turn, causes the contact 146 to open the 110 volt circuit of the selsyn motors.

In moving the reverse microswitch from its normally closed position, the finger cam 91 moves the microswitch into its alternate position to close the circuit of the green light bulb 123. Thus, the lighting of the bulb 123 gives visual indication to the operator that the setting of the knees has been completed.

At this point the operator observes that the value of 35 inches on the reference dial 108, which is connected to the set shaft 14, is under the index pointer 114. Thus, the reference dial and the control dial 97 are in identical positions, both indicating that the knees 13 are 35 inches from the plane of the saw blade 25.

Let it now be assumed that the forward edge of the log lies on the plane of the saw blade, that the saw blade cuts a kerf of one-third inch width and that the operator desires to make a slab cut of four inches. By rotating the hand wheel 106 the operator brings the value of 30⅔ inches on the control dial 97 under the pointer 101. This value represents 4⅓ inches to be cut from the 35 inch log, the ⅓ inch being the width of the kerf. In moving the control dial the operator thereby moves the microswitches 83 and 84 out of contact with the respective finger cams 90 and 91 and causes the circuit of the green light to be opened.

The operator now presses the forward push button 119, thereby completing the circuit of the forward relay coil 128, as explained hereinbefore. Breaker contacts 127 thereupon close to complete the 440 volt forward circuit of the set shaft motor 19, to energize the brake solenoid 154 and release the brake 155 and to energize the timer coil 151 and selsyn relay 147, as previously explained. The motor rotates the set shaft 14 and master selsyn 30 in the direction for the forward setting of the knees. By closure of contact 146 the red indicator lamp 122 and the selsyn motors are energized from the 110 volt supply lines.

As the finger cam 90 rotates into engagement with the forward microswitch 83, the latter opens to break the circuit of the forward relay coil 128 which, in turn, causes the breaker contacts 127 to open the circuit of the set shaft motor and timer coil 151. The finger cam 90 moves the forward microswitch to its alternate position to energize the green light bulb whereby to indicate that the forward setting of the knees has been completed. The time delay of opening the contact 150 to deenergize the selsyn relay 147 and the selsyn motors functions in the manner already described to accommodate proper tracking of the slave selsyn 46 during the override of the motor 19.

The operator observes that the value of 30⅔ inches which he had established upon the control dial 97 under the index pointer 101 is now also under the index pointer on the reference dial 108. The forward setting of the knees having thus been completed, the operator now manipulates the hand levers 36 to draw the carriage forwardly along the rails 7 and cut the slab from the log. During this cutting of the log the operator may readjust the control dial to the value desired for the next cut. Then, as the carriage is drawn back and the log clears the saw blade, the operator merely presses the forward push button 119. The cycle described hereinbefore is thus initiated to move the knees forwardly to the extent established by the setting on the control dial. Each cycle requires but a few seconds of time for completion.

As stated hereinbefore, the reference dial indicates at all times the distance separating the knees and the plane of the saw blade. Thus, during the resetting of the control dial for a new cut, if the operator should forget the numerical value which was under the index pointer 101 before the said dial was rotated, he need only glance to the reference dial for the starting value from which to compute the new setting of the control dial.

A modification of the setworks control mechanism described hereinbefore is shown in Figures 6 and 7 of the drawings. In this modification the previously described assembly of the slave selsyn motor 46, gear reduction unit 50, shaft 54, set shaft disc 59, shaft 64, control disc 69 and collector ring 72 is substantially identical, as is apparent from a comparison of Figures 2 and 6. The modification also utilizes the electrical system illustrated in Figure 5. The primary features of modification reside in the means for manual control of the shaft 64 and in the positions of the micro switches 83 and 84, as follows:

The end of shaft 64 opposite the bearing 63 extends outwardly of the case through a hole in the side wall 43 as in the construction previously described. Mounted upon the side wall 43, by the bolts 156, is an arcuate member 157, hereinafter referred to as a quadrant. The periphery of the quadrant is curved about the axial center of shaft 64 and is provided with a plurality of notches 158 spaced circumferentially at equal intervals, for example, representing one inch separations.

Mounted freely at one end upon the shaft 64 is a lever arm 159. The arm terminates at its outer end in a handle 160 which extends laterally outward from the side wall 43. The handle is slotted longitudinally to receive a pawl 161 which is pivoted intermediate its ends on pin 162 secured in the handle. A compression spring 163 is mounted at one end in a seat 164 formed in the handle. The opposite end of the spring engages the pawl adjacent its outer end and thus urges the opposite end of the pawl into engagement with the notched quadrant.

A second arm 165 disposed adjacent the lever arm 159 is secured at one end to shaft 64 by set screw 166. The opposite end of the second arm is curved on a radius extending from the axial center of shaft 64 and is notched to form a rack 167. The rack engages a pinion 168 mounted pivotally on pin 169 secured to the lever arm. A knurled knob 170 is mounted pivotally upon the pin 169 and functions as a grip by which to rotate the pinion 168. A lock nut 171 is provided on the end of pin 169 for purposes of securing the knob and pinion against accidental displacement after setting. The pinion is either secured firmly to the knob, or alternatively, the knob and pinion may be formed as an integral unit.

A U-shaped member 172 is secured to the second arm 165 and carries an arrow 173 arranged to register with a scale 174 provided on the lever arm 159. The scale is graduated preferably in fractions of an inch. Thus, for example, if the distance between adjacent notches on the quadrant is one inch, the scale is graduated to one-half inch on both sides of the central zero mark. In this manner precise adjustments may be obtained between adjacent notches, as explained in detail hereinafter.

The forward and reverse micro switches 83 and 84, respectively, are supported upon the control disc 69 at substantially diametrically opposite positions, as distinguished from the adjacent arrangement in the structure previously described. The diametric arrangement is not essential, however, but is preferred for accuracy since the rotation of the discs 59 and 69 are limited by the degree of arc of the quadrant 157. The micro switches are secured in holes formed in the control disc 69, it being unnecessary, though permissible, to provide adjustment slots as previously described.

The contacts 89 of the forward and reverse micro-switches 83 and 84, respectively, are actuated by finger cams 90 and 91, respectively, mounted upon the set shaft disc 59. Circumferential adjustability of these fingers is not required, and therefore they may be mounted in holes provided in disc 59 and secured therein by bolts 175.

The modification shown in Figures 6 and 7 is of particular utility in the control of a resaw wherein the setworks functions to adjust the position of a pair of vertical set rollers disposed upon one side of the plane of a saw blade opposite a pair of press rollers. In this type of operation the set rollers are usually adjusted to a desired spacing from the saw blade and maintained in that position for the cutting of a quantity of boards to common dimension. Thus, in resaw operation, the setworks does not operate to move a log or other form of wood in successive steps toward a saw blade, thereby distinguishing from the operation described hereinbefore with reference to the structure illustrated in Figures 1 to 4, inclusive.

The pair of vertical set rollers of a resaw are mounted upon a frame which is rendered movable by means of a lead screw, rack and pinion, or other conventional device movable by engagement with a set shaft. The set shaft is driven by a motor, and a master selsyn is connected to the drive shaft of the motor in substantially the manner shown in Figure 1. However, since the setworks does not function to control the stepwise movement of a piece of wood, the reference dial previously described is not employed in the present modification.

The operation of the setworks illustrated in Figures 6 and 7 in controlling the operation of a resaw is as follows: Assume, for purposes of illustration, that boards of random width are to be cut to four inch widths and that the pawl 161 is positioned in the five inch notch of quadrant 157, as shown in Figure 7. With the pair of vertical set rollers thus disposed five inches from the saw blade, the operator pivots the pawl out of the five inch notch and moves the handle 160 counterclockwise to the four inch notch and secures the pawl therein.

Since the set rollers are to be moved one inch toward the saw blade, the operator presses the forward push button 119. Referring to Figure 5 of the drawings, the closing of the forward push button energizes the forward relay coil 128 which closes the breaker contacts 127 in the 440 volt supply lines 126. The solenoid 154 is energized to release the brake 155 and the set shaft motor 19 is energized to drive the set shaft in the direction which moves the pair of vertical rollers toward the saw blade. The timer coil 151, the selsyn relay coil 147, the selsyn motors 30 and 46 and the red indicator lamp 122 are also energized in the manner described hereinbefore.

As the rotation of the set shaft moves the vertical set rollers toward the saw blade, the set shaft disc 59 rotates the finger cams 90 and 91 toward the respective microswitches 83 and 84. When the forward finger cam 90 engages and depresses the contact 89 of the forward microswitch 83, the circuit of the forward relay coil 128 is opened, the 440 volt supply to the set shaft motor 19, the brake solenoid 154 and timer coil 151 is cut off, the selsyn motors and the red indicator lamp 122 are deenergized after the delayed opening of contact 150, and the green lamp 123 is energized to indicate completion of the set, as previously described.

The operator now moves the pair of vertical press rollers away from the saw blade a distance sufficient to permit the board to be cut to enter between the pairs of rollers. After placing the board between the pairs of rollers the operator draws the press rollers toward the pair of set rollers adjusted by the setworks until the board is held firmly therebetween. The frictional contact of the vertically rotating rollers with the board causes the latter to be pulled through the saw blade and thus the proper cut is made. With boards of random width it is necessary to readjust the position of the pair of press rollers in the manner just explained.

Assume now that the operator desires to cut another group of boards to five and three-quarters inch widths. Accordingly, the pawl 161 is released from the four inch notch of the quadrant 157 and the handle rotated clockwise, as viewed in Figure 7, to the six inch notch and the pawl secured therein. The operator now loosens the lock nut 171 and rotates the knob 170 in a clockwise direction until the arrow 173 registers with the scale marking to the left of the central, zero mark which designates one-quarter inch. In this manner the second arm 165 has rotated the shaft 64 counterclockwise an amount equivalent to one-quarter inch on the quadrant. This quarter-inch is thereby subtracted from the six inch position of the handle pawl to obtain the five and three-quarters inches desired.

Since the distance between the saw blade and the vertical set rollers is to be increased from four inches to five and three-quarters inches, the operator now presses the reverse push button 120 and thereby causes the set shaft to draw the rollers away from the saw blade in accordance with the operating cycle described hereinbefore.

After the setting of the set rollers has been completed, as indicated by the lighting of the green lamp 123 and the extinguishing of the red lamp 122, the operator proceeds to feed the boards through the saw, adjusting the press rollers, when required, in the manner previously described.

A further modification of the setworks described hereinbefore is illustrated in Figures 8 to 14, inclusive. This modification also includes the assembly of the slave selsyn motor 46, gear reduction unit 50, shaft 54, set shaft disc 59, shaft 64, control disc 69 and collector ring 72 previously described. In the present modification the discs 59 and 69 are provided with laterally extending rims 175 and 176, respectively, formed preferably as integral parts thereof. These rims are scored or otherwise impressed to provide identical scales graduated preferably in inches and fractions thereof. Referring particularly to Figures 8 and 9 of the drawings, each rim is shown to have four rows of scales each graduated circumferentially to twenty-five inches and marked consecutively to one hundred inches. The right hand side of each rim is further graduated in quarters of one inch while the left hand side of each rim is graduated in thirds of one inch. The scaled rim 175 is hereinafter referred to as the reference dial and the scaled rim 176 the control dial. The reference dial 175 replaces the reference dial 108 mounted on the carriage in the structure shown in Figures 1 to 4.

The collector ring 72 is supported by control disc 69 by means of the circumferentially spaced brackets 177 mounted upon and projecting from the control dial rim 176.

Secured to the upright support 68 adjacent the inner bearing 65 is a bevel gear 178. This gear meshes with a second bevel gear 179 secured to screw shaft 180. The screw shaft is mounted for rotation in bearings provided in the spaced ends 181 and 182 of a bifurcated bracket 183 which is secured firmly to control disc 69 by the screws 184. The bracket and disc are provided with elongated slots 185 which are arranged in cooperating registry. The screw shaft 180 is threaded through the enlarged end 186 of the stem arm 187 of a T-shaped bracket, the reduced portion of said stem arm passing slidably through the slots 185 in the bracket and disc.

The transverse arm 188 of the T-shaped bracket forms a flat plate which functions as a mounting for the similarly shaped transverse arm 189 of a second T-shaped bracket, the said parts being secured together by screws. In order to insure positive attachment of the transverse arms, a cooperating groove and key is formed on said parts, as best shown in Figure 8 of the drawings.

The stem arm 190 projecting from the transverse arm 189 is also formed as a flat plate, the opposite faces of which function as mountings for the forward and reverse micro switches 83 and 84, respectively. A bolt 191 (Figure 13) extends through alined holes provided in the micro switches and arm 190 adjacent one end thereof. A second bolt 192 extends through alined holes in the micro switches adjacent the opposite end and through a cooperating arcuate slot 193 formed in the arm 190. In this manner the lateral position of the microswitches relative to the control disc 69 may be adjusted by sliding the bolt 192 through slot 193 about bolt 191 as a pivot.

The foregoing bevel gear and screw shaft assembly is duplicated for the reference dial 175 as follows: Bevel gear 178 is secured to support 58 adjacent the inner bearing 56 for engagement with the second bevel gear 179 mounted upon the end of screw shaft 180. The screw shaft is mounted for rotation in bearings provided in the spaced ends of the bifurcated bracket 183 which is secured to the set shaft disc 59 by screws 184. The pitch of the threads forming this screw shaft is reversed from the pitch of the threads on the screw shaft previously described. Bracket 183 and disc 59 are provided with alined slots 185, as previously described. The enlarged end 194 of arm 195 is threaded onto the screw shaft 180, while the reduced portion of the arm extends freely through the slots 185.

A block 92 is adjustably secured to the reduced end of arm 195 by means of screw 93 which extends through the transverse slot 94 provided in said block. In order to insure positive attachment of the block with the arm 195, a groove is formed in the block for receiving the end of the arm, as shown in Figure 8. Formed as an integral part of block 92 and projecting outwardly therefrom is a finger cam 91. A second finger cam 90 is mounted slidably in a groove formed in the block and secured therein by set screw 96. The finger cams are of substantial width and are curved longitudinally in the manner previously described.

Finger cams 90 and 91 are arranged for cooperative engagement with the spring-loaded contacts 89 of the respective forward and reverse microswitches 83 and 84. However, by virtue of the adjustable mountings upon the screw shafts 180, the microswitches and their cooperating contact finger cams become separated radially when the dials 175 and 176 are more than one revolution out of alinement. This arrangement thereby affords a substantial degree of setting between the dials, as explained in detail hereinafter.

Means is provided for establishing the proper scale row on the dials 175 and 176, as follows: Formed as integral parts of the upright supports 58 and 68 and projecting upwardly from the enlarged sections thereof are the standards 196 and 197, respectively. The upper ends of these standards form enlarged heads 198 and 199, respectively, which project toward each other in a common plane. Referring to Figure 9, each head is provided with a pair of spaced parallel guide grooves 200 and 201. The grooves 200 and 201 of heads 198 and 199, respectively, are arranged in axial alignment, as are the respective grooves 201 and 200 of heads 198 and 199. An alongated bar 202 having a rack section 203 adjacent one end thereof is arranged slidably at opposite ends in grooves 201 and 200 of heads 198 and 199, respectively, the said rack section being disposed in groove 201 of head 198. In similar manner, a second bar 204 having an end rack section 205 is arranged in grooves 200 and 201 of heads 198 and 199, respectively, with the rack section 205 disposed in groove 201 of head 199. A pointer 206 is secured to bar 202 for registration with the scales on the reference dial 175, while the pointer 207 on bar 204 registers with the scales on the control dial 176.

A circular well 208 is formed in the heads 198 and 199 between the respective pairs of guide grooves, each well being arranged to communicate with the grooves 201 which receive the rack sections of the bars 202 and 204. A pinion 209 is arranged for axial rotation within the well of head 198 and for engagement with rack 203. Similarly, pinion 210 is arranged in the well of head 199 for engagement with rack 205. The pivot shaft 211 of each pinion 209 and 210 projects through a hole formed in each head and terminates below the head in the respective star wheels 212 and 213.

A lug 214 (Figures 8 and 13) projects from identical points on each of the ends 182 of the bifurcated brackets 183. These lugs are arranged for engagement with the star wheels of the respective pinions once during each revolution of the dials 175 and 176. The lugs move into simultaneous contact with one of the teeth of their respective star wheels and thus the latter are rotated equal fractions of a turn as the lugs continue rotation. This rotation of the star wheels is transmitted to the pinions 209 and 210 which, referring to Figure 9 of the drawings, are thereby rotated in opposite directions. Thus, by the engagement of pinions 209 and 210 with the respective racks 203 and 205, the bars 202 and 204 are caused to move simultaneously in the same direction.

A plurality of indentations 215 are formed in the bars 202 and 204 adjacent their respective racks. These indentations are spaced longitudinally of the bars a distance equal to the spacing between the rows of scales on the dials 175 and 176. A ball 216 is mounted within a hole 217 formed in each of the heads 198 and 199 for registry with the indentations. Each ball is backed by a coil spring 218, one end of which engages the ball while the opposite end abuts against an adjustment screw 219 threaded into the tapped hole 217. Each ball is thus mounted resiliently in such manner that it is retractable from one indentation and engageable with an adjacent indentation as the bars are moved longitudinally upon rotation of the pinions.

The angular rotation of each star wheel upon contact by its cooperating lug 214 is arranged in such manner as to cause the bars 202 and 204 to move the distance between adjacent indentations. Thus, upon each revolution of the dials 175 and 176, the bars 202 and 204, and hence the pointers 206 and 207, are moved the distance between adjacent rows of scales. Each ball 216 centers within the proper indentation to insure positive and accurate alignment of the pointers with the proper row of scales on the dials 175 and 176. The operating elements contained within the heads 198 and 199 are sealed against entrance of foreign matter by the removable cover plates 220.

A rod 221 extends between the spaced heads 198 and 199 and is arranged at its opposite ends in threaded engagement with said heads. This adjustment is employed to correct possible misalignment of the pointers 206 and 207 with the rows of scales on the dials 175 and 176, respectively.

A wire 222 is secured at its opposite ends to adjustment screws 223 mounted in brackets 224 secured to the standards 196 and 197. The wire is drawn tight across the dials 175 and 176 and functions as an index for reading the scales. A light bulb 225 is mounted upon each of the standards 196 and 197 to illuminate the dials 175 and 176, respectively, and thereby facilitate reading of the latter. The illuminated dials are visible through a transparent window 226 provided in the oblique section of the top panel 40 of the case, as best shown in Figure 11.

In the manner of the setworks models described hereinbefore, indicator bulbs 122 and 123 are mounted upon a bracket 227 secured to the gear reduction unit 50 for registry with red and green colored jewels 124 and 125, respectively, mounted in the top panel 40. Also mounted in the top panel are the respective forward, reverse and safety stop push buttons 119, 120 and 121, described hereinbefore. It is understood, however, that these push buttons may be mounted separately from the case, as previously explained.

The end of shaft 64 opposite the bearing 63 extends outwardly of the case through an opening in the side wall 43. A hand control wheel 228 is mounted at its hub upon this outwardly projecting portion of the shaft by set screw 229. The hand wheel functions to be grasped by the hand of the operator for purposes of rotating the control dial 176 during operation of the setworks, in the manner described in detail hereinafter. In order to prevent unrestricted rotation of the hand wheel, a leather button 230 is mounted in frictional contact therewith upon one end of a leaf spring 231 secured at the opposite end to a bracket secured to the framework which supports the setworks case. The tension of the spring is adjustable by the screw 232 as previously explained. Thus, the leather button functions as a friction brake by which accidental displacement of the wheel 228, and hence the control dial 176, is obviated.

Referring now to Figure 14 of the drawings, there is shown a diagram of the preferred electrical system by which the several elements of the setworks are interconnected. In this modification the set shaft motor 233 is shown to be an air motor operated by the forward solenoid 234, the reverse solenoid 235 and the exhaust solenoid 236. The forward solenoid is connected to the 110 volt supply lines 237 and 238 through the normally open breaker contacts 239 and 240, respectively, of the forward relay coil 241. The reverse solenoid is connected to the 110 volt supply lines 237 and 238 through the normally open breaker contacts 242 and 243, respectively, of the reverse relay coil 244. The exhaust solenoid is connected to the supply line 237 through either of the normally open breaker contacts 239 and 242 of the respective forward and reverse relay coils 241 and 244, and to the supply line 238 through either of the breaker contacts 245 and 246 of said respective relay coils 241 and 244. Thus, it is apparent that the exhaust solenoid is actuated simultaneously with either the forward or reverse solenoids.

The forward relay coil 241 is connected at one end to the supply line 237 and at the other end through the forward knee limit switch 115, thence through the normally open forward push button 119 to collector ring 247, through line 248 and the normally closed forward microswitch 83, then through line 249 to collector ring 250, through line 251 and the normally closed safety push button 121 to the supply line 238. This circuit is completed by depressing the forward push button. When the forward relay coil thus becomes energized, it closes the holding contact 252 arranged in parallel with the forward push button 119. In this manner the circuit of the forward relay coil is maintained closed by the holding contact after the forward push button has been released to its normally open position.

In similar manner, the circuit of the reverse relay coil 244 is completed from supply line 237, through the reverse knee limit switch 116, through the normally open reverse push button 120 to collector ring 253, through line 254 and the normally closed reverse microswitch 84, through line 249 to collector ring 250, and thence through line 251 and the normally closed safety push button 121 to supply line 238. When the reverse relay coil is energized by depressing the reverse push button 120, the holding contact 255 closes and completes a circuit which shunts the reverse push button 120. Thus, the circuit of the reverse relay coil 244 is maintained complete after the reverse push button has been released to its normally open position.

When either the forward or reverse microswitch is opened upon contact of its respective finger cam 90 or 91, a circuit is completed from the supply line 237 through the green indicator bulb 123 to collector ring 256, through line 257 and either of the microswitches 83 or 84, whichever one is in the opened position, thence through line 249 to collector ring 250, through line 251 and the normally closed safety push button 121 to supply line 238. The lighting of the green bulb indicates that the setting of the knees has been completed, as previously explained.

The selsyn motors 30 and 46 are connected together by wires 145, as previously described, and are energized through the parallel conductors 258 and 259 connected to the 110 volt supply lines 237 and 238, respectively. Arranged in series in the supply line 238 leading to conductor 259 is the normally open selsyn contact 260. This contact is actuated by the selsyn relay coil 261 which is connected to the supply lines 237 and 238 through wires 262 and 263, respectively. A normally open timer contact 264 is arranged in series in wire 262 and is actuated by the timer relay coil 265. The timer coil is connected to the 110 volt supply lines through either the normally open breaker contacts 239 and 244 of the forward relay coil 241 or breaker contacts 242 and 245 of the reverse relay coil 244. The timer contact 264 is provided with delay means, represented in Figure 14 as a dash pot 266, which functions to delay the opening of the contact after being closed by the timer coil. In this manner the selsyn motors are maintained energized for a period of time following the deenergization of the air motor control solenoids. Thus, the slave selsyn 46 is capable of tracking the motor drive shaft 23 during the normal override of the motor, as explained hereinbefore.

The operation of the setworks illustrated in Figures 8 to 14, inclusive, is as follows: Let it be assumed that a log has just been completely cut into lumber and that the knees 13 have not yet been retracted. The operator observes that the numerical value on the reference dial 175 under the index line 222 and in the first row designated by pointer 206 is, for example, one inch. This indicates that the knees are spaced one inch from the plane of the saw blade 25. The same value is observed on the control dial 176 under the index line.

Assume now that a log, estimated by visual inspection to measure about forty inches in diameter, is to be cut. The operator rotates the control hand wheel 228 in the direction which will bring the value of forty inches on the second row of the control dial 176 under the index line 222. As the value of twenty-five inches on the first row of scales approaches the index line, the lug 214 on the bifurcated bracket arm 182 comes into engagement with the star wheel 213. Upon further rotation of the control dial the lug moves the star wheel axially through the angle defined by adjacent star wheel teeth. Referring to Figure 9, this rotation of the star wheel is transmitted through the shaft 211 to pinion 210 which, in turning clockwise, causes the bar 204 to move to the left, carrying the pointer 207 from the first row scale to the second row. As the lug passes from the tooth on the star wheel, the centering ball 216, which was removed from one indentation 215, moves into the adjacent indentation to center the pointer 207 upon the second scale. The operator brings the value of forty inches under the index line.

During the foregoing rotation of the control dial 176 from the scale value of one inch to forty inches, the bevel gear 179 has been caused to rotate upon the fixed bevel gear 178 and has thus imparted rotation to the screw shaft 180. This rotation of the screw shaft has resulted in sufficient outward movement of the T-shaped bracket that the microswitches 83 and 84 supported thereon become displaced radially from the respective finger cams 90 and 91.

Since it is required, in the present example, to retract the knees from the plane of the saw blade, the operator now presses the reverse push button 120. Referring to Figure 14 of the drawings, the closure of the reverse push button completes the circuit of the reverse relay coil 244 in the manner previously described, the holding contact 255 maintaining the completed circuit after release of the said push button. The circuits of the respective reverse and exhaust solenoids 235 and 236 are completed through the closed contacts 243, 245 and 242, whereby the air motor 233 is activated to drive the set shaft in the direction which draws the knees away from the plane of the saw blade.

Simultaneously with the reverse activation of the air motor, the selsyn motors and the red indicator lamp 122 are energized, as explained hereinbefore. Thus, as the set shaft rotates to retract the knees, the slave selsyn 46 causes the reference dial 175 to rotate in the direction of increasing numbers. The pointer 206 shifts from the first row of scales to the second row in passing the twenty-five inch marking in the manner explained with reference to the control dial 176.

As the reference dial is rotated by shaft 54, the simultaneous rotation of the bevel gear 179 and screw shaft 180 causes the finger cams 90 and 91 to be moved radially outward into the circumferential paths of the respective microswitches 83 and 84. Thus, when the value of forty inches on the reference dial 175 approaches the index line 222 the reverse finger cam 91 contacts and depresses the reverse microswitch 84. The reverse microswitch thereupon opens and breaks the circuit of the reverse relay coil 244, the reverse and exhaust solenoids 235 and 236, respectively, and the timer relay coil 265. By deenergization of the exhaust solenoid 236, the exhaust port of the air motor is closed and the air motor is braked rapidly to a stop.

When the reverse finger cam 91 opened the normally closed reverse microswitch 84, as just explained, the said cam moved the microswitch to its alternate position and thereby closed the circuit of the green bulb 123 to indicate that the setting of the knees is completed. With the delayed opening of the timer contact 264, and hence the opening of the selsyn contact 260, the red indicator lamp 122 and the selsyn motors become deenergized.

The operator now manipulates the hand levers 36 to deposit and secure the log upon the carriage in proper position against the knees. Further rearward adjustment of the knees, if required, is achieved by repeating the foregoing cycle. Forward adjustment of the knees is accomplished by reversing the rotation of the control hand wheel 228, and hence the control dial 176, and pressing the forward push button 119. The details of the forward cycle is believed readily apparent from the foregoing discussion.

From the detailed description of the construction and operation of the several modifications illustrated, it is believed apparent that those skilled in the art will recognize the many advantages provided by the present invention. When employed as setworks in sawmill operation the required adjustments are made rapidly with facility and precision. Lumber production is substantially increased while the requirement for operating personnel is reduced to a single sawyer. Complete safety of operation is afforded by removal of the control unit to a position remote from the carriage.

It will be further apparent to those skilled in the art that the present invention is readily adaptable for use with other than sawmill apparatus. In general, the present invention is capable of controlling the angular displacement or rotation of any shaft or other device driven by an electrically controllable motor. Thus, for example, the dials may be graduated in degrees to designate the angular rotation of a rotary shaft.

Many of the structural details described hereinbefore may be changed without departing from the scope and spirit of the present invention. For example, the size of the control and reference dials and the ratios of the several sprockets and gears may be altered to accommodate greater or lesser ranges of control. The types and relative positions of operating parts may be changed as desired. For example, the positions of the microswitches and their actuating finger cams may be reversed.

Although it is a particular advantage that controlled operation of a sawmill carriage assembly, or other apparatus adaptable to the present invention, may be performed from a remote position, it is conceivable that some installations will not require the remote coupling. In such instances direct mechanical coupling of the shaft 54 with the shaft to be controlled may be made.

Regarding the remote coupling illustrated and described herein, the master and slave selsyn system may be replaced by any other equivalent servo type system, in manner well-known to those skilled in the art.

The foregoing and various other changes will be recognized by those skilled in the art. Accordingly, it is to be understood that the foregoing description is merely illustrative of this invention and is not to be considered in a limiting sense.

Having thus described our invention and the manner in which the same may be used, what we claim as new and desire to secure by Letters Patent is:

1. A device for controlling the angular displacement of a rotary shaft powered by an electrically actuated reversible motor, said device comprising, in combination with electric forward and reverse circuits for actuating the motor, starter switch means in each circuit, a pair of independently rotatable supports, a pair of second switch means mounted upon one of the supports and each arranged in the respective one of the forward and reverse circuits of the motor-actuating means, a pair of switch-actuating means mounted upon the other of said supports, coupling means interconnecting the rotary shaft and one of the rotatable supports, and control means connected to the other support for adjustably rotating the latter whereby to displace the second switch means and switch-actuating means angularly in proportion to the angular displacement through which the rotary shaft is to be rotated, each of the pair of second switch means functioning upon engagement with its corresponding switch-actuating means by rotation of the rotary shaft to open the respective forward and reverse electrical supply circuit of the motor-actuating means, whereby to stop the rotation of the rotary shaft after the latter has rotated through the angle selected.

2. The device of claim 1 wherein the starter switch means and the said one of the rotatable supports are positioned remotely from the rotary shaft and the interconnecting coupling means comprises a servo motor system.

3. The device of claim 1 wherein the coupling means comprises an electric servo motor system including delayed breaker means in the circuit of the servo motor system for opening the latter after rotation of the rotary shaft has stopped.

4. The device of claim 1 wherein the switch means and switch-actuating means are mounted on the rotatable supports for relative circumferential adjustment.

5. The device of claim 1 wherein the switch means and switch-actuating means are mounted on the rotatable supports for relative radial adjustment to permit their displacement by more than one revolution of their supports.

6. The device of claim 1 wherein the mountings for the switch means and switch-actuating means each includes a screw shaft mounted for rotation upon the rotatable support, a fixed support adjacent the screw shaft, and gear means coupling the screw shaft to the fixed support, whereby the screw shafts rotate simultaneously with the respective rotatable supports to move the switch means and switch-actuating means radially with respect to said rotatable supports, thereby permitting initial displacement of the switch means and switch-actuating means by more than one revolution of their rotatable supports.

7. The device of claim 1 including a dial mounted for rotation with the adjustment support, a second dial mounted for rotation with the rotary shaft, and a fixed index mounted for registry with each dial, each dial being graduated to indicate with reference to its respective index the angular displacement of the rotary shaft.

8. A device for controlling the angular displacement of a rotary shaft powered by an electrically actuated reversible motor, said device comprising, in combination with electric forward and reverse circuits for actuating the motor, breaker means detachably connecting the motor actuating means to the respective circuits for forward and reverse rotation of the motor, electrical actuating means for each of the forward and reverse breaker means and having electric circuits, starter switch means in each circuit of the breaker-actuating means, a pair of independently rotatable supports, a pair of second switch means mounted upon one of the supports and each arranged in the circuit of the respective one of the forward and reverse breaker-actuating means, a pair of switch-actuating means mounted upon the other of said supports, coupling means interconnecting the rotary shaft and one of the rotatable supports, and control means connected to the other support for adjustably rotating the latter in either direction whereby to displace the second switch means and switch-actuating means angularly in proportion to the angular displacement through which the rotary shaft is to be rotated, each of the pair of second switch means functioning upon engagement with its corresponding switch-actuating means by rotation of the rotary shaft to open the respective forward and reverse electrical supply circuits of the motor-actuating means, whereby to stop the rotation of the rotary shaft after the latter has rotated through the angle selected.

9. In combination with a saw, a carriage having knees mounted slidably thereon and driven by a set shaft powered by an electrically actuated reversible motor, and electric forward and reverse circuits for actuating the motor; a setworks positioned remotely from the carriage and comprising a pair of first switch means each arranged in the respective one of the forward and reverse circuits of the motor-actuating means, a pair of switch-actuating means, the first switch means and switch-actuating means being mounted independently for relative adjustable displacement proportionate to the distance between the saw and the knees, control means connected to one of the means (switch and switch-actuator) for adjustably displacing said means from the other of said means a distance proportionate to the distance through which the knees are to be moved, coupling means including a servomotor system interconnecting the remotely positioned set shaft and one of the means (switch and switch-actuator) whereby to return the displaced switch means and switch-actuating means into mutual engagement after the set shaft has moved the knees through the distance selected by the relative displacement of the first switch means and switch-actuating means, and starter switch means in the forward and reverse circuits of the motor-actuating means for selectively energizing the latter, the starter switch means being positioned remotely from the carriage, the first switch means functioning upon engagement with the switch-actuating means by rotation of the set shaft to open the circuit of the motor-actuating means and stop the motor after the knees have moved the distance selected.

10. In combination with a set shaft powered by an electrically actuated reversible motor, and electric forward and reverse circuits for actuating the motor; a setworks comprising starter switch means in each electric circuit positioned remotely from the set shaft, a pair of independently rotatable supports, a pair of second switch means mounted upon one of the supports and each arranged in the respective one of the forward and reverse circuits of the motor-actuating means, a pair of switch-actuating means mounted upon the other of said supports, servomotor coupling means interconnecting the set shaft and one of the rotatable supports positioned at remote distances, and control means connected to the other support for adjustably rotating the latter whereby to displace the second switch means and switch-actuating means angularly in proportion to the angular displacement through which the set shaft is to be rotated, each of the pair of second switch means functioning upon engagement with its corresponding switch-actuating means by rotation of the set shaft to open the respective forward and reverse electrical supply circuit of the motor-actuating means, whereby to stop the rotation of the set shaft after the latter has rotated through the angle selected.

11. A sawmill setworks comprising, in combination with a set shaft powered by an electrically actuated reversible motor, and electric forward and reverse circuits for actuating the motor; breaker means detachably connecting the motor actuating means to the respective circuits for forward and reverse rotation of the motor, electrical actuating means for each of the forward and reverse breaker means and having electric circuits, starter switch means in each circuit of the breaker-actuating means, a pair of independently rotatable supports, a pair of second switch means mounted upon one of the supports and each arranged in the circuit of the respective one of the forward and reverse breaker-actuating means, a pair of switch-actuating means mounted upon the other of said supports, coupling means interconnecting the set shaft and one of the rotatable supports, and control means connected to the other support for adjustably rotating the latter in either direction whereby to displace the second switch means and switch-actuating means angularly in proportion to the angular displacement through which the set shaft is to be rotated, each of the pair of second switch means functioning upon engagement with its corresponding switch-actuating means by rotation of the set shaft to open the respective forward and reverse electrical supply circuit of the motor-actuating means, whereby to stop the rotation of the set shaft after the latter has rotated through the angle selected.

12. In combination with a set shaft powered by an electrically actuated motor, and an electric circuit for actuating the motor; a setworks comprising starter switch means in the circuit positioned remotely from the set shaft, a pair of independently rotatable supports remote from said set shaft, second switch means mounted upon one of the supports and arranged in the circuit of the motor-actuating means, switch-actuating means mounted upon the other of said supports, servomotor coupling means interconnecting the set shaft and one of the rotatable supports, the other support functioning as adjustment means by which to displace the second switch means and switch-actuating means angularly in proportion to the angular displacement through which the set shaft is to be rotated, the second switch means functioning upon engagement with the switch-actuating means by rotation of the set shaft to stop the rotation of the set shaft after the latter has rotated through the angle selected, lever means secured integrally to the adjustment support for rotation therewith, and a quadrant mounted adjacent the lever means and graduated to indicate the angular displacement of the set shaft.

13. In combination with a saw, a carriage having knees mounted slidably thereon and driven by a set shaft powered by an electrically actuated reversible motor, and electric forward and reverse circuits for actuating the motor; a sawmill setworks comprising starter switch means in each circuit, a pair of independently rotatable supports, a pair of second switch means mounted upon one of the supports and each arranged in the respective one of the forward and reverse circuits of the motor-actuating means, a pair of switch-actuating means mounted upon the other of said supports, coupling means interconnecting the set shaft and one of the rotatable supports, control means connected to the other support for adjustably rotating the latter in either direction whereby to displace the second switch means and switch-actuating means angularly in proportion to the angular displacement through which the set shaft is to be rotated, each of the pair of second switch means functioning upon engagement with its corresponding switch-actuating means by rotation of the set shaft to stop the rotation of the set shaft after the latter has rotated through the angle selected, a dial mounted for rotation with the adjustment support, a second dial mounted for rotation with the set shaft, and a fixed index mounted for registry with each dial, each dial being graduated to indicate with reference to its respective index the distance between the knees and the plane of the saw.

14. The setworks of claim 13 wherein the starter switch means and rotatable supports are positioned remotely from the carriage and the coupling means interconnecting the set shaft and the said one of the rotatable supports comprises a servomotor system.

15. A sawmill setworks comprising, in combination with a saw, a carriage having knees mounted slidably thereon and driven by a set shaft powered by an electrically actuated reversible motor, and electric forward and reverse circuits for actuating the motor; starter switch means in each circuit, a pair of independently rotatable supports remote from said set shaft, a pair of second switch means mounted upon one of the supports and each arranged in the respective one of the forward and reverse circuits of the motor-actuating means, a pair of switch-actuating means mounted upon the other of said supports, servomotor coupling means interconnecting the set shaft and one of the rotatable supports, control means connected to the other support for adjustably rotating the latter whereby to displace the second switch means and switch-actuating means angularly in proportion to the angular displacement through which the set shaft is to be rotated, each of the pair of second switch means functioning upon engagement with its corresponding switch-actuating means by rotation of the set shaft to open the respective forward and reverse electrical supply circuit of the motor-actuating means, whereby to stop the rotation of the set shaft after the latter has rotated through the angle selected, a dial mounted for multiple rotation with the adjustment support, a second dial mounted for multiple rotation with the coupled support, a fixed index mounted for registry with each dial, each dial being graduated circumferentially in spaced rows and numbered consecutively for successive rotations to indicate with reference to its respective index the distance between the knees and the plane of the saw, a pointer registering with each dial and mounted upon a slidable support, and interengaging means on each cooperating slidable support and dial for moving the pointer to adjacent graduated rows during rotation of said dial through successive revolutions.

16. In a device for measuring the angular displacement of a rotary shaft, a dial mounted for multiple rotation with the shaft, the dial being graduated circumferentially in longitudinally spaced rows and numbered consecutively for successive rotations to indicate the angular displacement of the rotary shaft, a pointer registering with the dial and mounted upon a slidable support on an axis parallel to the rotational axis of the dial, and interengaging means on the slidable support and dial for moving the pointer axially of the dial to adjacent graduated rows during rotation of said dial through successive revolutions.

17. In a device for measuring the angular displacement of a rotary shaft, a dial mounted for multiple rotation with the shaft, the dial being graduated circumferentially in longitudinally spaced rows and numbered consecutively for successive rotations to indicate the angular displacement of the rotary shaft, a pointer registering with the dial and mounted upon a slidable support having a rack section extending parallel to the rotational axis of the dial, a pinion engaging the rack section, a star wheel secured to the pinion, and lug means on the dial arranged to engage the star wheel upon successive revolutions of the dial, whereby to move the pointer axially of the dial to adjacent graduated rows.

References Cited in the file of this patent

UNITED STATES PATENTS

| Number | Name | Date |
|---|---|---|
| Re. 20,658 | Knight | Feb. 22, 1938 |
| 1,226,037 | Walding | May 15, 1917 |
| 1,326,732 | Holme | Dec. 30, 1918 |
| 1,342,915 | Johnson | June 8, 1920 |
| 1,725,861 | Grueter | Aug. 27, 1929 |
| 1,755,975 | Willard | Apr. 22, 1930 |
| 1,810,029 | Pelton | June 16, 1931 |
| 1,836,496 | Percy | Dec. 15, 1931 |
| 1,850,640 | Sperry et al. | Mar. 22, 1932 |
| 1,909,815 | De Florez | May 16, 1933 |
| 1,944,326 | Hudson | Jan. 23, 1934 |
| 2,069,516 | Baker | Feb. 2, 1937 |
| 2,175,822 | Best | Oct. 10, 1939 |
| 2,342,967 | Peters | Feb. 29, 1944 |
| 2,370,992 | Perry et al. | Mar. 6, 1945 |
| 2,438,545 | Davidson | Mar. 30, 1948 |
| 2,464,389 | Grau | Mar. 15, 1949 |
| 2,505,262 | Torcheux | Apr. 25, 1950 |
| 2,517,155 | Yardeny | Aug. 1, 1950 |
| 2,550,700 | Lancor et al. | May 1, 1951 |
| 2,574,393 | Hult | Nov. 6, 1951 |

FOREIGN PATENTS

| Number | Country | Date |
|---|---|---|
| 928,393 | France | June 2, 1947 |